(12) United States Patent
Haupt et al.

(10) Patent No.: US 6,729,199 B2
(45) Date of Patent: May 4, 2004

(54) RING FOR TRANSMITTING TORQUE AND FOR AXIALLY SECURING TWO ROTATING COMPONENTS

(75) Inventors: Josef Haupt, Tettnang (DE); Alfred Skrabs, Sitterswald (DE); Andreas Beisswenger, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/130,916

(22) PCT Filed: Dec. 13, 2000

(86) PCT No.: PCT/EP00/12639
§ 371 (c)(1),
(2), (4) Date: May 23, 2002

(87) PCT Pub. No.: WO01/46599
PCT Pub. Date: Jun. 28, 2001

(65) Prior Publication Data
US 2002/0189387 A1 Dec. 19, 2002

(30) Foreign Application Priority Data
Dec. 22, 1999 (DE) .......................................... 199 61 988

(51) Int. Cl.$^7$ .............................................. F16H 55/17
(52) U.S. Cl. ....................................... 74/434; 192/17 A
(58) Field of Search ........................ 74/434; 192/12 R, 192/13 R, 17 A, 18 R, 18 A

(56) References Cited

U.S. PATENT DOCUMENTS

| 4,098,378 A | * | 7/1978 | Helmer ..................... 192/17 A |
| 4,944,376 A | | 7/1990 | Ozaki et al. ............... 192/17 A |
| 5,226,517 A | * | 7/1993 | Grochowski ........... 192/85 AA |
| 5,267,807 A | * | 12/1993 | Biedermann et al. ........ 403/375 |

FOREIGN PATENT DOCUMENTS

| DE | 1 140 033 | 5/1963 | |
| DE | 94 11 268.1 | 10/1994 | .......... B60K/17/02 |
| DE | 44 14 575 A1 | 11/1995 | ............. F16D/3/16 |
| DE | 195 44 316 A1 | 5/1996 | ........... F16D/11/04 |

* cited by examiner

Primary Examiner—David Fenstermacher
(74) Attorney, Agent, or Firm—Davis & Bujold, PLLC

(57) ABSTRACT

The invention concerns an apparatus for torque transmission and axial securing of a first (24) and a second (26) torque conducting component. The apparatus has the form of a ring shaped component (20), which possesses along its circumference projections (22) which are spaced from one another and which are insertable in such a manner in the spaces between projections (28) of the second component (26) which lies on a surface (30) of the first component (24), that the sides of the projections (22) which face the surface (30) of the first component (24) can be affixed to the first component (24).

13 Claims, 5 Drawing Sheets

RING FOR TRANSMITTING TORQUE AND FOR AXIALLY SECURING TWO ROTATING COMPONENTS

FIELD OF THE INVENTION

The present invention concerns an apparatus for the simultaneous transmission of torque and axially securing two torque carrying components and the invention further concerns a procedure for the connection of two torque carrying components with this apparatus.

BACKGROUND OF THE INVENTION

In the following, in connection with the FIGS. 1 to 3, known arrangements for the transmission of torque between two torque carrying components is explained and described.

For example, in FIG. 1, a torque transmission occurs between an internal gear 1 and a come-along part 2 in the form of a cylinder of a multi-plate clutch (not described in further detail), whereby, in the cylinder in a known way, a piston 3 is placed in an axially movable manner, which piston, in regard to the cylinder, is sealed by a ring seal 4. To accomplish the torque transmission the back of the cylinder and the internal gear are welded together at their respective contiguous surfaces 1' and 2'. A disadvantage of such a design is to be found, in that the internal gear 1 and the cylinder are compelled to rotate together and no tangential, radial or axial play adjustments are possible.

FIG. 2 shows a known arrangement for the transmission of torque, between an internal gear 1 and a come-along part 2, wherein in the internal gear 1 on that side proximal to the come-along part 2, a toothed crown 6 is placed, into the teeth of which the complementary teeth 7 of the come-along part 2 axially engage. In the axial direction the come-along part 2 is secured by a ring spring 8 as shown in the presentation of FIG. 2. The problem with this arrangement is especially to be found in that for each internal gear 1 a separate milling operation must be carried out to produce the said crown teeth 6. It is obvious, that such a manufacturing step for internal gears is extremely costly. Beyond that, an additional component in the form of a ring spring 8 is necessary, whereby the manufacturing costs for the apparatus become even more expensive. This construction, however, does permit, in the desired manner, certain tangential, radial and axial play adjustments.

FIG. 3 presents still another means of transmission of torque, in which in the come-along part 2, a crown toothing 10 is supplied, into which the crown toothing 12 meshes, wherein crown toothing 12 is to be found on a radial flange 14 which projects over the internal gear 1. Even this solution to the problem is obviously expensive and costly, because, first in the come-along part 2, in a separate operation, a stamped out crown toothing 10 must be made, and second in the internal gear 1, the crown toothing 12 must be made by a separate milling operation. Besides this, also an additional component for the axial securement, again in the form of a ring spring 8 is necessary.

The purpose of the invention is to create an apparatus for simultaneous torque transmission and axial securement of two torque conducting components, which enable a relative simple connection of the two components and allow a tangential, radial and axial play compensation. Beyond this, the invention creates a procedure for the connection of two torque conducting components with the said apparatus.

The purpose of the invention is achieved by an apparatus for simultaneous torque transmission and axial securement of two torque conducting components employing the features of patent claim 1 and by a procedure having the features of patent claim 7.

SUMMARY OF THE INVENTION

The essential advantage of the invention is to be found therein, in that a connection between two components is achievable in a particularly simple way, on the end face of the first component a toothing of a second component is axially placed, an invented component, which exhibits the form of a segmental ring is axially placed against the toothing of the second component, in such a manner, that respectively, a projection of the component engages in an opening between two teeth of the second component and lies on the end face of the first component, and that finally the projection which engages into the opening is fastened to the first component.

In this way, between the first and the second component a tangential play, a radial play and an axial play are assured, and, at the same time, it is avoided that an the first component an expensive crown toothing is necessary. The said compensation in tangential, radial and axial directions is achieved advantageously simultaneously with the axial securement between the two components of the invented apparatus. Advantageously, the invented component can be made by a simple stamping and forming operation.

In accord with a further advantage of the invention, also the second component can be produced having its toothing also made by means of a stamping operation.

The component connection can, advantageously, be produced with a small radial space demand, since no ring spring mounting is necessary.

BRIEF DESCRIPTION OF THE DRAWINGS

The invention will now be described, by way of example, with reference to the accompanying drawings in which.

DETAILED DESCRIPTION OF THE INVENTION

Figure 4:
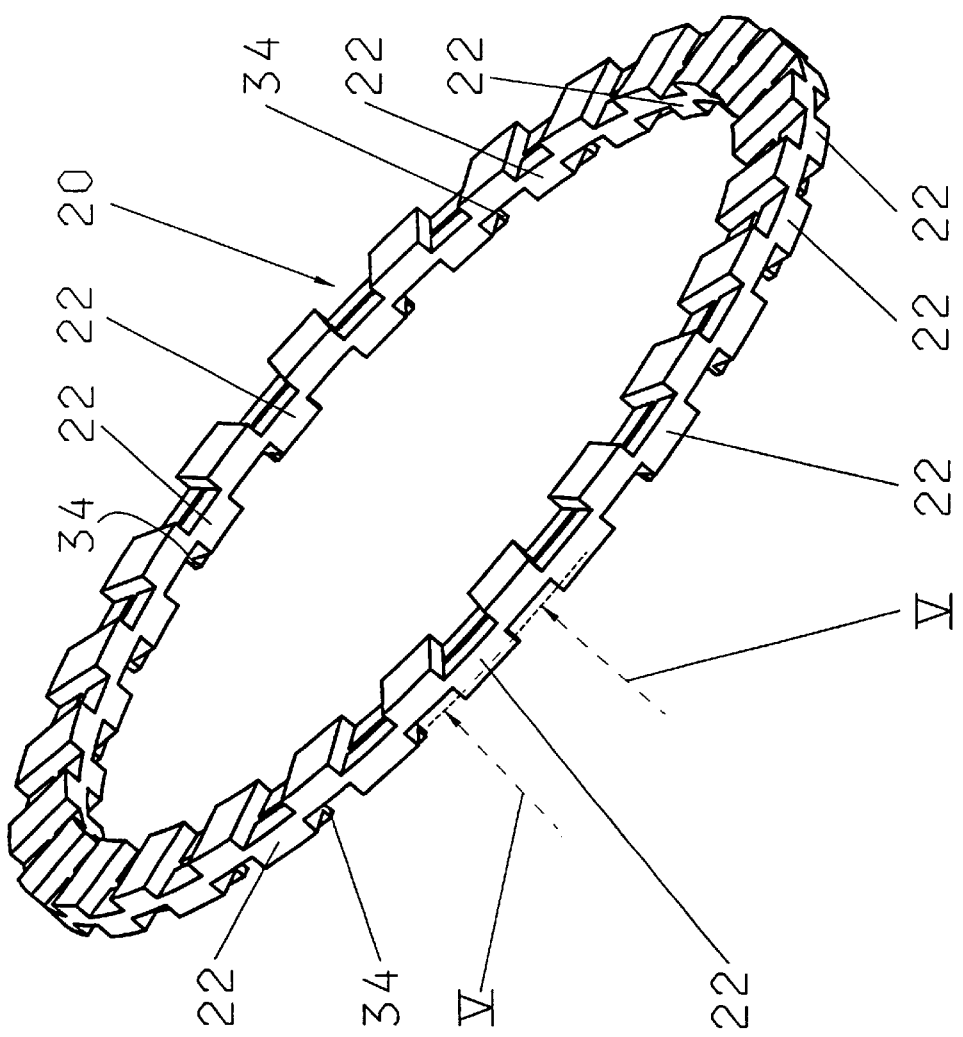
FIG. 4 is a perspective presentation of the invented apparatus in the form of a segmented ring.
Figure 7:
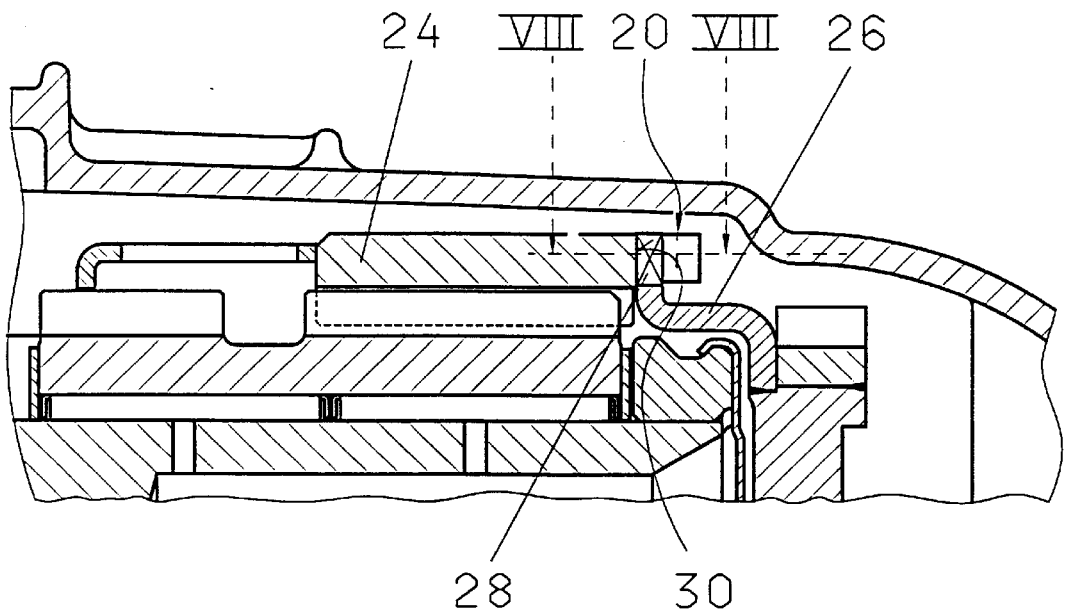
FIG. 7 is an axial section through the invented apparatus mounted on two components.
Figure 8:
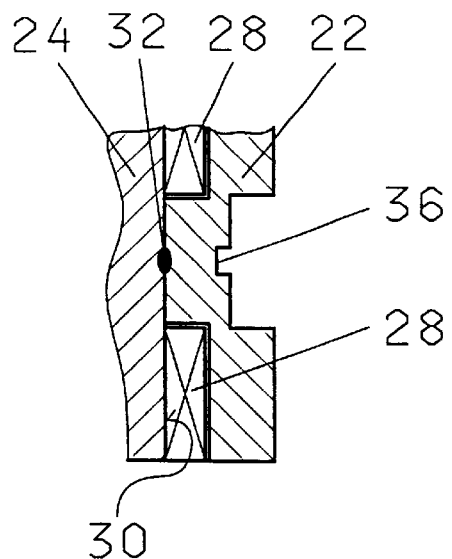
FIG. 8 is a view corresponding to the sectioning of VIII—VIII.

In accord with FIG. 4, the present apparatus is essentially in the form of a circular ring shaped component 20, which, along its circumference possesses projections 22, each projection distanced from the other. Advantageously, these said projections 22 can be formed by a stamping operation from the ring shaped component 20 to extend out of one side. So constructed, this one side represents, as seen in FIGS. 7 and 8, the side facing the first component 24, and also facing the second component 26, which components, by means of the invented apparatus, are to be fastened together for the simultaneous transmission of torque and to insure against axial movement. In this arrangement, the first component 24, in accord with FIG. 7, advantageously has the shape of an internal gear, against which a come-along part of the second component 26 is to be engaged. Along its circumference, component 26 advantageously has equally spaced, toothlike projections 28, which are to lie against a side 30 of the first component 24 which faces them.

For the radial and axial engagement of the components 24 and 26 to one another, the component 20 is so set upon the components 24, 26, which lie one against the other, that the projections 22 of the component 20 penetrate into the spaces between the projections 28 of the component 26. This allows the end faces of the projections 22 facing the component 24 to lie on the surface 30 of the component 24.

The true connection of the component 20 onto the component 24 is then done by means of a fastening operation, advantageously by means of a welding procedure, especially by means of an economical KE-welding method or a laser or BE welding with a radial welding beam. In certain cases of application, consideration can be given to making the connection by adhesive means.

Figure 6:
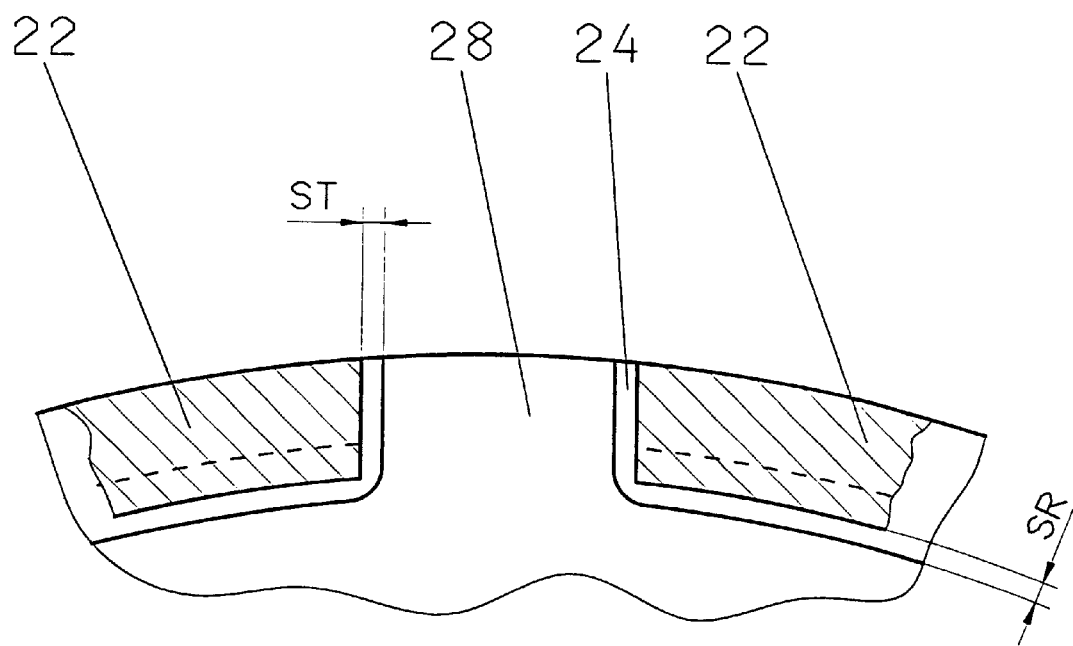
FIG. 6 is a partial section of an axial view of the two components as well as the segment ring to explain the tangential and radial compensation of plays.

Now, in accord with FIG. 6, the projections 28 of the component 26 are trapped between the projections 22 of the component 20, whereby the possibility of a tangential play ST as well as a radial play SR exists. The axial security is carried out, as this is also to be seen in FIG. 8, by the acceptance of the projection 28 of the component 26 between the surface 30 of the component 24 and, respectively, sections of component 20 which bridge over two projections 22 of component 20, which gives rise to the possibility of an axial play.

Figure 1:
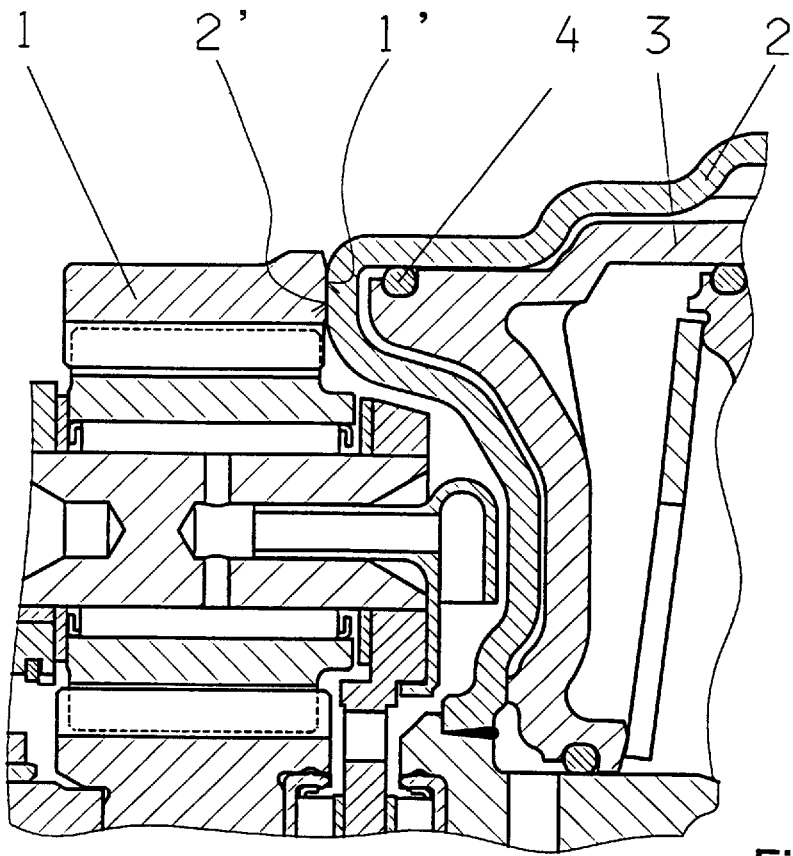
FIG. 1 is a known kind of torque transmission between two components, wherein the components are butt-welded together.
Figure 2:
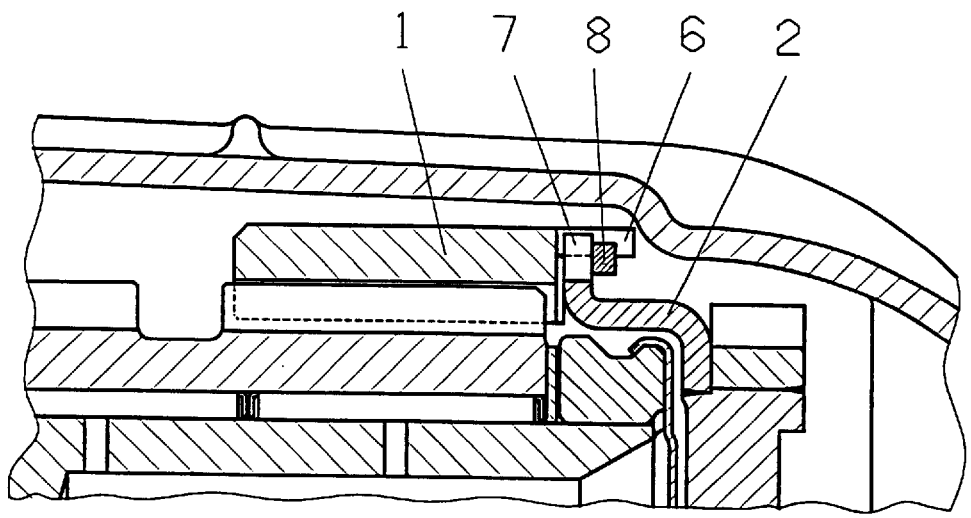
FIG. 2 is a further known kind of torque transmission between two components, whereby the one component engages itself in a crown toothing of the other and for axial securement, an additional ring spring is provided.
Figure 3:
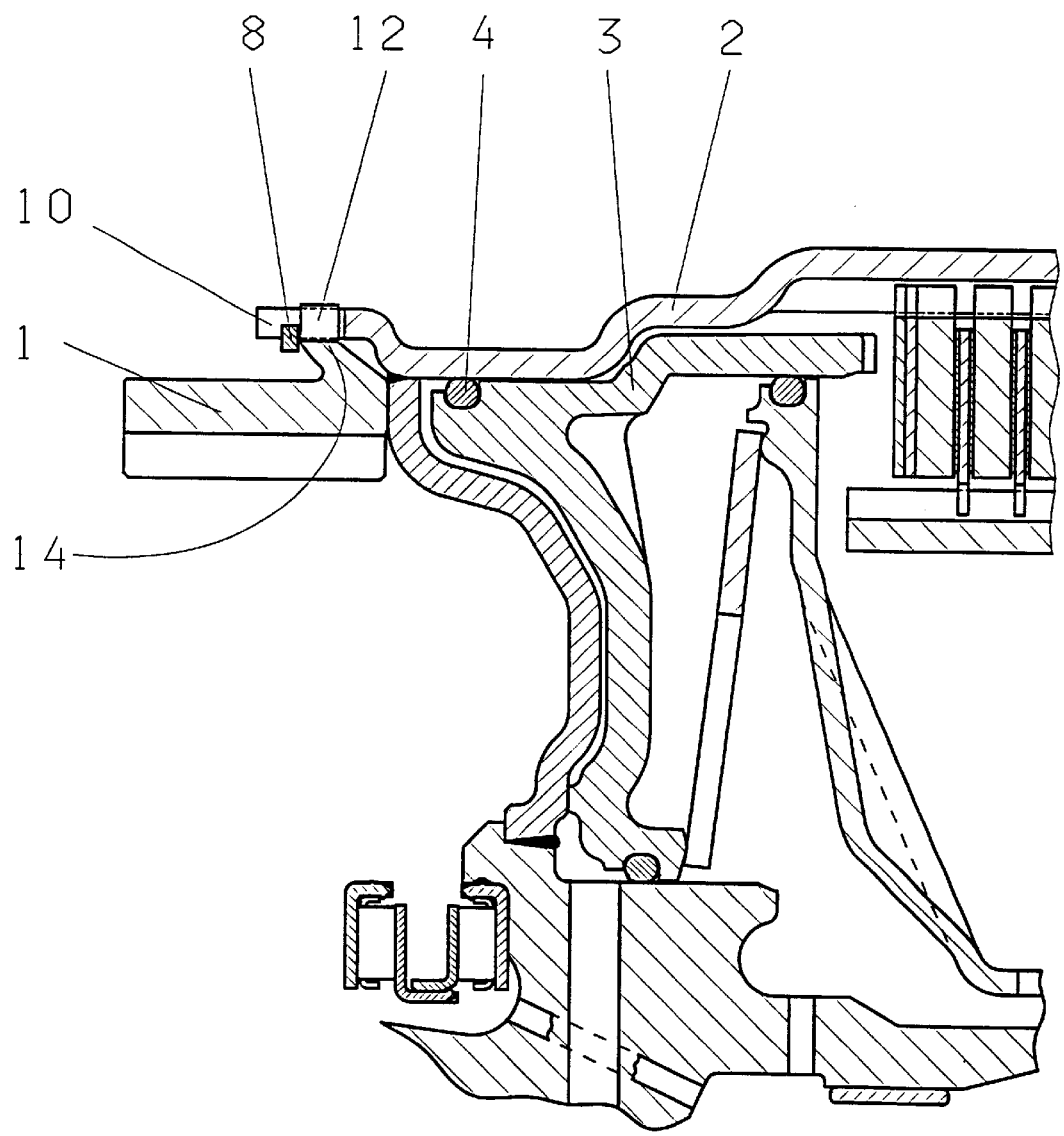
FIG. 3 is a further known kind of torque transmission between two components, wherein the two components engage each other by means of two crown toothings and for axial security, an additional ring spring is provided.
Figure 5:
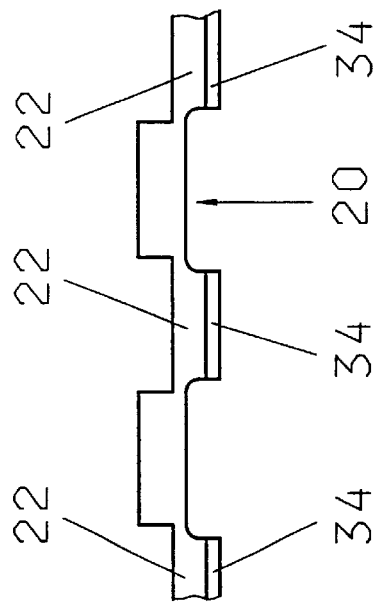
FIG. 5 is a side view between the section lines V—V of the invented apparatus shown in FIG. 4.

In accord with the FIGS. 4, 5 and 8, consideration can be given in the stamping operation, when the projections 22 are made in the ring shaped component 20, to produce simultaneously on the said projections 22 a riblike extension 34 on the side facing the component 24. After the insertion of the projections 22—as has been explained—in the spaces between the projections 28 of the component 26, these extensions find themselves lying against the surface 30 of the component 24. In accord with FIG. 8, these riblike extensions 34 can be used as a welding material supply, which, during the execution of the welding operation become welding seam 32.

During the stamping operation, in the making of the riblike extensions 30 on the opposite positioned side respectively, there is formed a corresponding recess 36 in the ring shaped component 20 opposite the projection 22. Advantageously, the component is composed of steel.

What is claimed is:

1. An apparatus for torque transmission and axial securement of a first torque transmitting component (24) and a second torque transmitting component (26) comprising:
    a plurality of spaced apart radially extending projections (28) formed on the second torque transmitting component defining a plurality of spaces therebetween;
    a ring shaped component (20) having a periphery and a plurality of spaced apart axial projections (22) extending axially adjacent the periphery, each of the plurality of axial projections having a radial end face for insertion in the spaces between the radially extending projections (28) of the second torque transmitting component (26); and
    wherein the first torque transmitting component (24) is provided with a surface (30) to which the radial end faces of the axial projections (22) of the ring shaped component (20) can be affixed to axially couple and secure the first torque transmitting component (24) with the second torque transmitting component (26).

2. The apparatus according to claim 1 wherein the plurality of spaced apart axial projections (22) of the ring shaped component (20) affixed to the surface (30) of the first torque transmitting component are circumferentially spaced from one another to permit the plurality of spaced apart radially extending projections (28) formed on the second torque transmitting component to have both tangential and radial play relative to the first torque transmitting component.

3. The apparatus according to claim 2, wherein the ring-shaped component (20) and the plurality of spaced apart axial projections (22) are produced simultaneously by a stamping and forming operation.

4. The apparatus according to claim 3, wherein each of the plurality of spaced apart axial projections (22) is provided with a rib-shaped extension (34) extending in the axial direction of the component (20).

5. The apparatus according to claim 4, wherein the rib-shaped extensions (34) of the axial projections (22) are formed simultaneously with the stamping of the projections (22).

6. The apparatus according to claim 1, wherein the ring shaped component (20) is composed of steel.

7. An method for coupling a first torque transmitting component (24) and a second torque transmitting component (26) to provide torque transmission and axial securement therebetween, the method comprising the steps of:
    forming a plurality of spaced apart radially extending projections (28) on the second torque transmitting component to define a plurality of spaces therebetween;
    producing a ring shaped component (20) having a periphery and a plurality of spaced apart axial projections (22) extending axially adjacent the periphery, each of the plurality of axial projections having a radial end face and inserting the axial projections and radial end faces in the spaces between the radially extending projections (28) of the second torque transmitting component (26); and
    affixing the radial end faces of the axial projections (22) of the ring shaped component (20) to a surface (30) of the first torque transmitting component (24) to axially couple and secure the first torque transmitting component (24) with the second torque transmitting component (26).

8. The method according to claim 7, further comprising the step of affixing the axial projections (22) of the ring shaped component (20) onto the surface (30) of the first torque transmitting component (24) by means of a welding operation.

9. The procedure according to claim 8, further comprising the step of affixing the axial projections (22) of the ring shaped component to the surface (30) of the first torque transmitting component (20) by KE welding operation.

10. The procedure according to claim 8 further comprising the step of affixing the axial projections (22) of the ring shaped component to the surface (30) of the first torque transmitting component by one of a laser welding operation and an EB welding operation.

11. The procedure according to claim 7 further comprising the step of affixing the axial projections (22) of the ring shaped component (20) to the surface (30) of the first torque transmitting component by adhesive means.

12. An apparatus for axially securing a first torque transmitting component (24) and a second torque transmitting component (26) comprising:
- a plurality of spaced apart radially extending projections (28) formed on a periphery of the second torque transmitting component and defining a corresponding plurality of spaces between each said radially extending projection;
- a ring (20) having a plurality of spaced apart axial projections (22) defining a corresponding plurality of axial spaces therebetween, each of the plurality of axial projections having a radial end face for attachment to a corresponding surface (30) of the first torque transmitting component;
- the plurality of spaced apart radially extending projections (28) formed on the periphery of the second torque transmitting component are inserted in the corresponding plurality of axial spaces of the ring to movably interlock the ring and the second torque transmitting component; and
- wherein the radial end face of each of the plurality of spaced apart axial projections (22) is affixed to the surface (30) of the first torque transmitting component to couple the first and second torque transmitting components and permit the transmission of torque therebetween.

13. The apparatus according to claim 12 wherein the axial spaces of the ring are tangentially and radially larger then the corresponding radially extending projections inserted therein to permit tangential and radial play between the first and second torque transmitting components.

\* \* \* \* \*